United States Patent
Kojo et al.

(10) Patent No.: US 6,904,999 B2
(45) Date of Patent: Jun. 14, 2005

(54) VEHICULAR STEERING CONTROL DEVICE AND VEHICULAR STEERING CONTROL METHOD

(75) Inventors: Takahiro Kojo, Susono (JP); Junji Kawamuro, Susono (JP); Masatoshi Nakatsu, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 26 days.

(21) Appl. No.: 10/614,872

(22) Filed: Jul. 9, 2003

(65) Prior Publication Data

US 2004/0016591 A1 Jan. 29, 2004

(30) Foreign Application Priority Data

Jul. 26, 2002 (JP) ........................................ 2002-218261

(51) Int. Cl.[7] ................................................. B62D 5/06
(52) U.S. Cl. ...................................... 180/422; 180/444
(58) Field of Search .......................... 180/402, 403, 180/444, 446, 421, 422

(56) References Cited

U.S. PATENT DOCUMENTS 4,956,590 A * 9/1990 Phillips ...................... 318/432
6,164,150 A    12/2000 Shindo et al.
6,367,577 B2 * 4/2002 Murata et al. ............... 180/446
6,763,908 B2 * 7/2004 Ogawa et al. ............... 180/446
2003/0150666 A1 * 8/2003 Ogawa et al. ............... 180/443

FOREIGN PATENT DOCUMENTS

JP            11001175 A   *  1/1999   ............ B62D/6/00

* cited by examiner

Primary Examiner—Kevin Hurley
(74) Attorney, Agent, or Firm—Oliff & Berridge, PLC

(57) ABSTRACT

A target relative rotational angle $\Delta\theta t$ which is created by a steering gear ratio change unit and which is formed by a lower steering shaft relative to an upper steering shaft is calculated on the basis of a steering angle $\theta$, and a post-correction target relative rotational angle $\Delta\theta ta$ to be created by the steering gear ratio change unit is calculated on the basis of the target relative rotational angle $\Delta\theta t$ and a vehicle speed range that has been determined on the basis of a vehicle speed V. Thus, a target relative rotational angle in one lateral direction is so corrected as to be equal to or smaller than a difference between a permissible rotational angle to be defined by a spiral cable in the other lateral direction and a maximum possible rotational angle of the lower steering shaft in the other lateral direction. An electric motor is controlled on the basis of the post-correction target relative rotational angle $\Delta\theta ta$.

19 Claims, 8 Drawing Sheets

VEHICULAR STEERING CONTROL DEVICE AND VEHICULAR STEERING CONTROL METHOD

INCORPORATION BY REFERENCE

The disclosure of Japanese Patent Application No. 2002-218261 filed on Jul. 26, 2002, including the specification, drawings, and abstract is incorporated herein by reference in its entirety.

BACKGROUND OF THE INVENTION

1. Field of the Invention

The invention relates to a vehicular steering control device and a vehicular steering control method, more particularly, to a steering control device having steering transmission ratio change means and a method for the steering control device.

2. Description of the Related Art

As one vehicular steering control device for an automobile or the like having steering transmission ratio change means, for example, there has been known a steering control device disclosed in the U.S. Pat. No. 6,164,150, which was also filed by the present applicant. This steering control device has an input portion coupled to a steering wheel operated by a driver, an output portion drivingly connected to steered wheels via a steering gear box, and steering transmission ratio change means for changing a steering transmission ratio by causing the input and output portions to rotate relative to each other by means of an actuator that rotationally operates in association with the steering wheel.

In general, the actuator of the steering transmission ratio change means is an electric motor. A main body of the electric motor is supported by the input portion, and a rotational shaft of the electric motor is coupled to the output portion. The electric motor causes the input and output portions to rotate relative to each other, whereby a steering transmission ratio is changed. The main body of the electric motor is supplied with power by an electric connection mechanism from the side of a vehicle body.

As a driver performs a steering operation, the main body of the electric motor rotates relative to the vehicle body, together with the steering wheel and the input portion. The electric connection mechanism has an outer power supply member that is fixed to the vehicle body and that annularly extends around the input portion, an inner power supply member that is fixed to the input portion inside the outer power supply member, and a spiral cable that extends between the outer power supply member and the inner power supply member and that is wound around the inner power supply member a couple of times. The electric motor is supplied with control current through conductor wires contained in the spiral cable. A permissible rotational angle that is formed between the input and output portions and that is restricted by a spiral cable unit is set larger than a relative rotational angle that is formed between the input and output portions and that is determined by a steering mechanism or the like. However, if the actuator is in a certain situation, the permissible rotational angle restricted by the spiral cable unit is insufficient. As a result, an excessive tensile force may be applied to the spiral cable.

For instance, if the steering transmission ratio change means becomes incapable of controlling steering transmission ratio normally owing to a malfunction of a sensor or a high load applied to the actuator, the actuator is stopped and a lock unit is operated. As a result, the input and output portions are prevented from rotating relative to each other. Hence, if the driver rotationally operates the steering wheel greatly in opposite directions after the actuator and the lock unit have been brought out of and into operation respectively due to a malfunction or the like of the sensor under a circumstance where the input and output portions form a relatively large relative rotational angle, the permissible rotational angle restricted by the spiral cable unit can be regarded as having decreased by an angle corresponding to the relative rotational angle formed between the input and output portions. Thus, an excessive tensile force is applied to the spiral cable. This may cause rewinding or breaking of the spiral cable.

SUMMARY OF THE INVENTION

It is an object of the invention to reliably prevent an excessive tensile stress from being applied to a spiral cable even if a steering wheel has been rotationally operated greatly by a driver in an operative state of a lock unit, by preventing a relative rotational angle of an input portion and an output portion from becoming excessive through restriction of a rotational angle of an actuator.

A vehicular steering control device in accordance with a first aspect of the invention has an input portion coupled to a steering wheel that is operated by a driver, an output portion drivingly connected to steered wheels, a steering transmission ratio change device that changes a steering transmission ratio by causing the input portion and the output portion to rotate relative to each other by an actuator that rotationally operates in association with the steering wheel, and an electric connection mechanism that supplies the actuator with electric power from an external side. This steering control device has a restriction device that sets a restricted relative rotational angle to be created by the actuator in one lateral direction equal to or smaller than a difference between a permissible rotational angle to be defined by the electric connection mechanism in the other lateral direction and a maximum possible rotational angle of the output portion in the other lateral direction, and that controls a relative rotational angle to be created by the actuator in said one lateral direction to an angle equal to or smaller than the restricted relative rotational angle.

According to the aforementioned first aspect, a restricted relative rotational angle to be created by the actuator in one lateral direction is set equal to or smaller than a difference between a permissible rotational angle to be defined by the electric connection mechanism in the other lateral direction and a maximum possible rotational angle of the output portion in the other lateral direction, and a magnitude of a relative rotational angle to be created by the actuator in said one lateral direction is controlled to a value equal to or smaller than a magnitude of the restricted relative rotational angle. As will be detailed later, therefore, it is possible to reliably prevent a magnitude of a relative rotational angle to be created by the actuator in one lateral direction from becoming larger than a difference between a permissible rotational angle to be defined by the electric connection mechanism in the other lateral direction and a maximum possible rotational angle of the output portion in the other lateral direction, and to reliably prevent an excessive stress from being applied to the electric connection mechanism due to an excess of the magnitude of the relative rotational angle to be created by the actuator over the difference.

Further, in the aforementioned first aspect, the actuator may have a stator coupled to one of the input and output portions and a rotor coupled to the other of the input and output portions. In this construction, the actuator has the stator coupled to one of the input and output portions and the rotor coupled to the other of the input and output portions. Therefore, it is possible to reliably cause the input and output portions to rotate relative to each other, and to reliably control a relative rotational angle formed therebetween.

Further, in the aforementioned aspect, the restriction device may set a magnitude of a target relative rotational angle to be created by the actuator equal to or smaller than a magnitude of the restricted relative rotational angle. In this construction, a magnitude of a target relative rotational angle to be created by the actuator is set equal to or smaller than a magnitude of the restricted relative rotational angle. Therefore, it is possible to effectively prevent a magnitude of a relative rotational angle to be created by the actuator from becoming larger than a magnitude of the restricted relative rotational angle.

Further, in the aforementioned aspect, the restriction device may inhibit an amount of relative rotation of the input and output portions from increasing or decreasing if a magnitude of a relative rotational angle to be created by the actuator becomes equal to or larger than a magnitude of the restricted relative rotational angle. In this construction, if a magnitude of a relative rotational angle to be created by the actuator becomes equal to or larger than a magnitude of the restricted relative rotational angle, an amount of relative rotation of the input and output portions is inhibited from increasing or decreasing. Therefore, it is possible to effectively prevent a magnitude of a relative rotational angle to be created by the actuator from becoming still larger than a magnitude of the restricted relative rotational angle.

Further, in the aforementioned aspect, the restriction device may inhibit an amount of relative rotation of the input and output portions from increasing or decreasing if a magnitude of a relative rotational angle to be created by the actuator becomes equal to or larger than a predetermined value that is smaller than a magnitude of the restricted relative rotational angle. In this construction, if a magnitude of a relative rotational angle to be created by the actuator becomes equal to or larger than a predetermined value that is smaller than a magnitude of the restricted relative rotational angle, an amount of relative rotation of the input and output portions is inhibited from increasing or decreasing. Therefore, it is possible to more effectively prevent a magnitude of a relative rotational angle to be created by the actuator from becoming still larger than the predetermined value.

Further, in the aforementioned aspect, the restriction device may inhibit the amount of relative rotation from increasing or decreasing by causing the input and output portions to rotate integrally, and may reduce a rotational output of the actuator. In this construction, the amount of relative rotation is inhibited from increasing or decreasing through achievement of an integrally rotating state of the input and output portions, and a rotational output of the actuator is reduced. Therefore, it is possible to reliably prevent a magnitude of a relative rotational angle to be created by the actuator from further increasing. Also, it is possible to effectively prevent energy from being wastefully consumed by the actuator and to effectively prevent a rise in temperature from being caused by heat generated by the actuator as a result of wasteful consumption of energy.

Further, in the aforementioned first aspect, the restriction device may set a restricted relative rotational angle as an angle whose magnitude is smaller than a difference between a permissible rotational angle to be defined by the electric connection mechanism in the other lateral direction and a maximum possible rotational angle of the output portion in the other lateral direction, and may control a magnitude of a relative rotational angle to be created by the actuator in said one lateral direction to a value equal to or smaller than a magnitude of the restricted relative rotational angle.

Further, in the aforementioned first aspect, the electric connection mechanism may have an outer power supply member fixed to a vehicle body, an inner power supply member fixed to the input portion or the output portion, and a flexible spiral cable that spirally extends around the inner power supply member and that contains conductor wires for connecting the outer power supply member with the actuator.

Further, in the aforementioned aspect, the permissible rotational angle to be defined by the electric connection mechanism in the other lateral direction may be a permissible rotational angle that is defined in the other lateral direction by a length of the spiral cable, an inner diameter of the outer power supply member, and an outer diameter of the inner power supply member.

Further, in the aforementioned first aspect, the output portion may be drivingly connected to the steered wheels via a steering mechanism, and the maximum possible rotational angle of the output portion in the other lateral direction may be a maximum possible rotational angle that is defined by a turnable range of the steered wheels or an operable range of the steering mechanism.

In the aforementioned aspect, the actuator may be an electric motor. In addition, the electric motor may be coupled at the stator to the input portion and at the rotor to the output portion.

In the aforementioned aspect, the restriction device may set a target relative rotational angle to be created by the actuator as an angle whose magnitude is smaller than a restricted relative rotational angle.

In the aforementioned aspect, the restriction means may prevent the input and output portions from rotating relative to each other if a magnitude of a relative rotational angle to be created by the actuator becomes equal to or larger than a magnitude of a restricted relative rotational angle.

In the aforementioned aspect, the restriction device may prevent the input and output portions from rotating relative to each other if a magnitude of a relative rotational angle to be created by the actuator becomes equal to or larger than a predetermined value that is smaller than a magnitude of a restricted relative rotational angle.

In the aforementioned aspect, a rotational output of the actuator may be reduced to 0.

A control method in accordance with a second aspect of the invention, for a vehicular steering device having an input portion coupled to a steering wheel that is operated by a driver, an output portion drivingly connected to steered wheels, a steering transmission ratio change device that changes a steering transmission ratio by causing the input portion and the output portion to rotate relative to each other by an actuator that rotationally operates in association with the steering wheel, and an electric connection mechanism that supplies the actuator with electric power from an external side, the control method comprises the steps of: setting a restricted relative rotational angle to be created by the actuator in one lateral direction equal to or smaller than a difference between a permissible rotational angle to be defined by the electric connection mechanism in the other lateral direction and a maximum possible rotational angle of the output portion in the other lateral direction; and controlling a relative rotational angle to be created by the actuator in said one lateral direction to an angle equal to or smaller than the restricted relative rotational angle.

DETAILED DESCRIPTION OF PREFERRED EMBODIMENTS

Hereinafter, some preferred embodiments (hereinafter referred to simply as embodiments) of the invention will be described in detail with reference to the accompanying drawings.

First Embodiment

Figure 1:
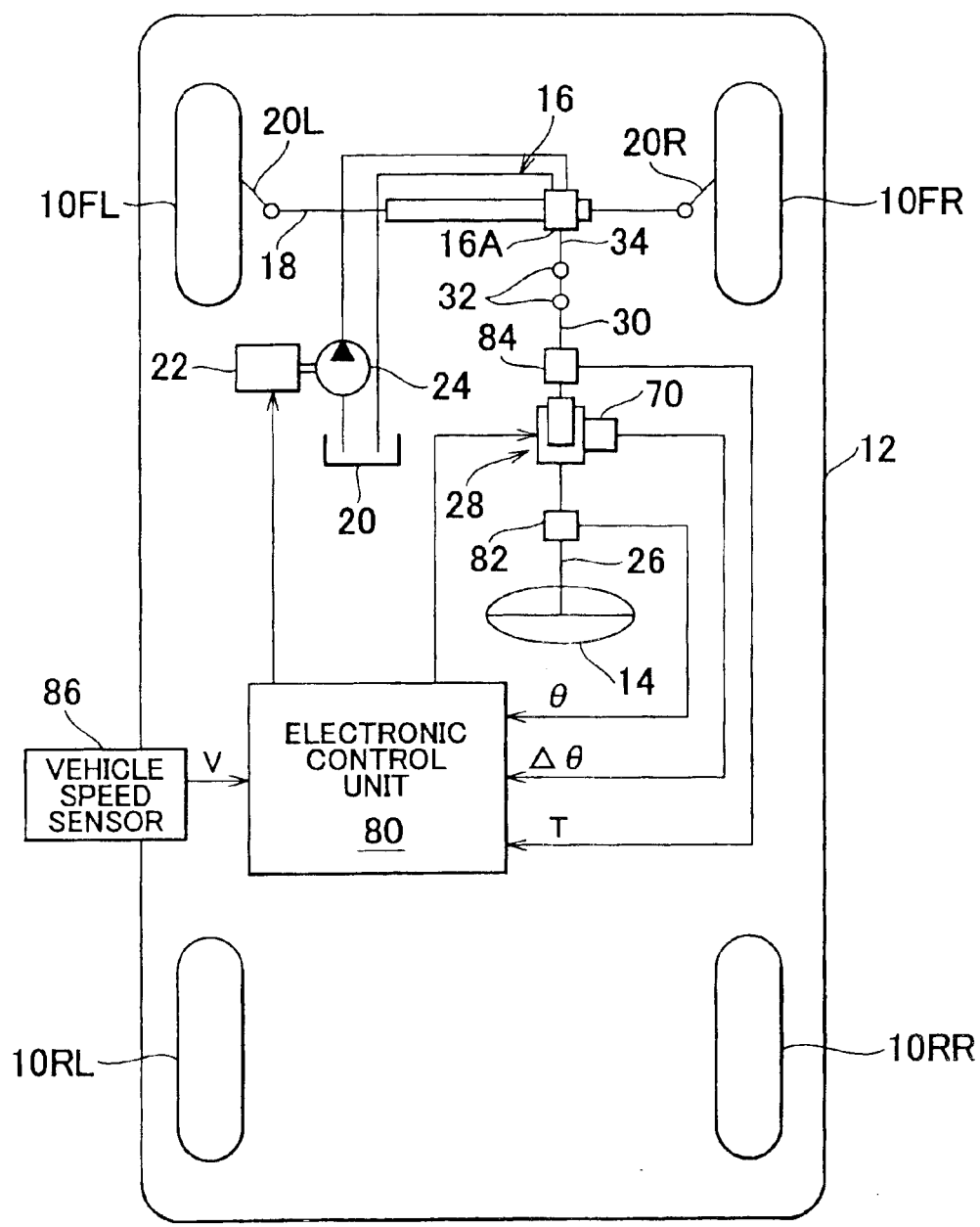
FIG. 1 is a block diagram showing an overall arrangement of a vehicular steering control device in accordance with a first embodiment of the invention which is applied to a vehicle provided with a hydraulic power steering unit.
Figure 2:
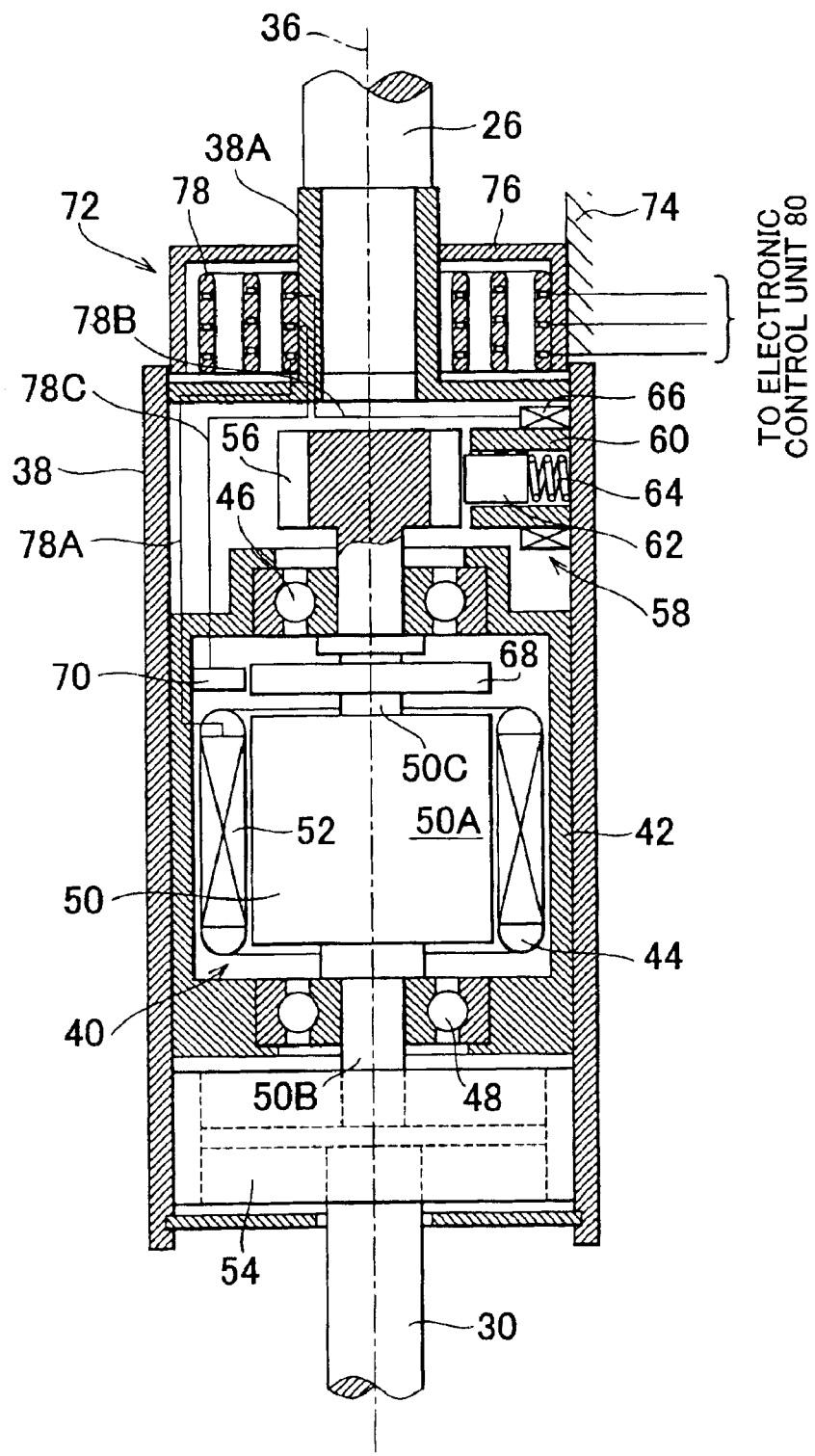
FIG. 2 is an enlarged cross-sectional view of a steering gear change unit shown in FIG. 1.

FIG. 1 is a block diagram showing an overall arrangement of a vehicular steering control device in accordance with the first embodiment of the invention which is applied to a vehicle provided with a hydraulic power steering unit. FIG. 2 is an enlarged cross-sectional view of a steering gear ratio change unit shown in FIG. 1.

Referring to FIG. 1, reference symbols 10FL and 10FR denote front-left and front-right wheels of a vehicle 12 respectively, while reference symbols 10RL and 10RR denote rear-left and rear-right wheels of the vehicle respectively. The front-left and front-right wheels 10FL and 10FR as steering wheels are turned by a hydraulic power steering unit 16 of rack-and-pinion type via a rack bar 18 and tie rods 20L and 20R. The hydraulic power steering unit 16 is driven in response to operation of a steering wheel 14 by a driver.

In the illustrated embodiment, the hydraulic power steering unit 16 has a control valve 16A having a known structure. High-pressure oil is supplied from a reservoir 20 to the control valve 16A via an oil pump 24 that is driven by an electric motor 22. The power steering unit 16 generates a steering assist torque corresponding to a steering torque generated as a result of rotational operation of the steering wheel 14 by the driver.

The steering wheel 14 is drivingly connected to a pinion shaft 34 of the power steering unit 16 via an upper steering shaft 26, a steering gear ratio change unit 28, a lower steering shaft 30, and a pair of universal joints 32. The power steering unit 16 cooperates with the rack bar 18 and the tie rods 20L and 20R, thus constituting a steering mechanism that converts a rotational movement of the lower steering shaft 30 into turning movements of the front-left and front-right wheels 10FL and 10FR.

In the illustrated embodiment, as shown in FIG. 2, the steering gear ratio change mechanism 28 includes a generally cylindrical housing 38 that extends in alignment with an axis 36 of the upper steering shaft 26 as an input portion and the lower steering shaft 30 as an output portion. A coupling portion 38A at an upper end of the housing 38 is coupled to a lower end of the upper steering shaft 26.

An electric motor 40 is accommodated in the housing 38 and is fixed thereto by being press-fitted thereto. The electric motor 40 has a stator 44 fixed to a motor housing 42 and a rotor 50 rotatably supported by bearings 46 and 48 that are disposed at opposed ends of the motor housing 42. The rotor 50 has a permanent magnet portion 50A having a large diameter. A coil 52 is wound around the stator 44 surrounding the permanent magnet portion 50A.

A lower shaft 50B of the rotor 50 penetrates the bearing 48, extends along the axis 36, and is coupled to an upper end of the lower steering shaft 30 via a reduction unit 54. An upper shaft 50C of the rotor 50 penetrates the bearing 46 and extends along the axis 36. A lock holder 56 is fixed to an upper end of the upper shaft 50C. A plurality of lock grooves spaced apart from one another in the same direction are formed on an outer peripheral face of the lock holder 56.

A lock unit 58 of plunger type is fixed to an inner face of the housing 38 in such a manner as to face the lock holder 56. The lock unit 58 has a guide tube 60, a plunger 62, a helical compression spring 64, and a solenoid 66. The guide tube 60 extends radially and perpendicularly to the axis 36, and is fixed to an inner face of the housing 38. The plunger 62 is disposed in the guide tube 60 such that the plunger 62 can reciprocate therein. The helical compression spring 64 radially inwardly urges the plunger 62 toward the lock holder 56. The solenoid 66 is wound around the guide tube 60.

By controlling energization of the solenoid 66, the lock unit 58 is switched between its lock-on state and its lock-off state. When the solenoid 66 is deenergized, the plunger 62 is fitted into the lock grooves of the lock holder 56 and prevents rotation of the rotor 50 of the electric motor 40, thus creating a lock-on state in which relative rotation of the upper steering shaft 26 and the lower steering shaft 30 is prevented. On the other hand, if the solenoid 66 is energized, the plunger 62 is radially outwardly driven against a spring force of the helical compression spring 54 and thereby moves away from the lock grooves of the lock holder 56, thus creating a lock-off state in which rotation of the rotor 50 of the electric motor 40 is permitted.

A permanent magnet disc 68 is fixed to the upper shaft 50C between the permanent magnet portion 50A of the rotor 50 and the bearing 46. A plurality of N poles and S poles are alternately disposed on an outer peripheral face of the permanent magnet disc 68. A rotational angle sensor 70, which cooperates with the permanent magnet disc 68 so as to detect a rotational angle Φ of the rotor 50 and hence a relative rotational angle Δθ of the upper steering shaft 26 and the lower steering shaft 30, is fixed to an inner face of the motor housing 42 in such a manner as to face the permanent magnet disc 68.

In the illustrated embodiment, a spiral cable unit 72 is disposed around the coupling portion 38A of the housing 38. The spiral cable unit 72 has an outer power supply member 76, an inner power supply member, and a spiral cable 78. The outer power supply member 76 annularly extends around the coupling portion 38A and is fixed to a vehicle body 74. Although not shown in FIG. 2, the inner power supply member is fixed to the coupling portion 38A inside the outer power supply member 76. The spiral cable 78, which is fixed at its outer end to the outer power supply member 76 and at its inner end to the inner power supply member, is spirally wound around the inner power supply member a couple of times.

The spiral cable 78 has an electrical insulating sheath which is elastic like rubber or resin and which contains a plurality of conductor wires 78A to 78C. Each of the conductor wires 78A to 78C is connected at one end to a corresponding one of the coil 52 of the electric motor 40, the solenoid 66 of the lock unit 58, and the rotational angle sensor 70. Each of the conductor wires 78A to 78C is connected at the other end to an electric control unit 80.

As the steering wheel 14 is rotationally operated, the steering gear ratio change unit 28 rotates together with the upper steering shaft 26 relative to the vehicle body 74. Therefore, when the lock unit 58 is in its lock-on state, the permissible rotational angles θsrmax and θslmax of the spiral cable unit 72 in right-turn and left-turn directions are determined by an inner diameter of the outer power supply member 76, an outer diameter of the inner power supply member, and a length of the spiral cable 78, and are so set as to satisfy inequalities θsrmax>θrmax and |θslmax|>|θlmax|. It is to be noted herein that θrmax and θlmax respectively represent possible rotational angles of the steering wheel 14 that are determined in the right-turn and left-turn directions by a movable range of the rack bar of the power steering unit 16, turnable ranges of the front-left and front-right wheels 10FL and 10FR, or the like. Namely, it is to be noted herein that θrmax and θlmax respectively represent maximum steering angles in the right-turn and left-turn directions.

Thus, when the lock unit 58 is in its lock-off state, the steering gear ratio change unit 28 changes a steering gear ratio as a steering transmission ratio by rotating the lower steering shaft 30 relative to the upper steering shaft 26 through rotation of the electric motor 40. Conversely, when the lock unit 58 is in its lock-on state, the steering gear ratio change unit 28 integrally connects the upper steering shaft 26 with the lower steering shaft 30.

In the illustrated embodiment, the upper steering shaft 26 is provided with a steering angle sensor 82 that detects a rotational angle of the upper steering shaft 26 as a steering angle θ. The lower steering shaft 30 is provided with a torque sensor 84 that detects a torque generated in the lower steering shaft as a steering torque T. Signals indicating a steering angle θ and a steering torque T are input to the electronic control unit 80. A signal indicating a vehicle speed V detected by a vehicle speed sensor 86 is input to the electronic control unit 80 as well.

As will be described later, according to a flowchart shown in FIG. 3, the electronic control unit 80 calculates on the basis of a steering angle θ a target relative rotational angle Δθt formed by the lower steering shaft 30 relative to the upper steering shaft 26 by means of a map corresponding to a graph shown in FIG. 4, determines on the basis of a vehicle speed V whether the vehicle runs at a speed in a low vehicle speed V range, an intermediate vehicle speed range, or a high vehicle speed range, calculates on the basis of the vehicle speed range and the target relative rotational angle Δθt a post-correction target relative rotational angle Δθta after correction made by the steering gear ratio change unit 28 by means of a map corresponding to a graph shown in FIG. 5, calculates on the basis of the post-correction target relative rotational angle Δθta and a gear ratio of the reduction unit 54 a target rotational angle θmt of the electric motor 40, controls the electric motor 40 such that a rotational angle of the electric motor 40 becomes equal to a target rotational angle θmt, and thereby controls a steering gear ratio in accordance with the vehicle speed range.

Figure 3:
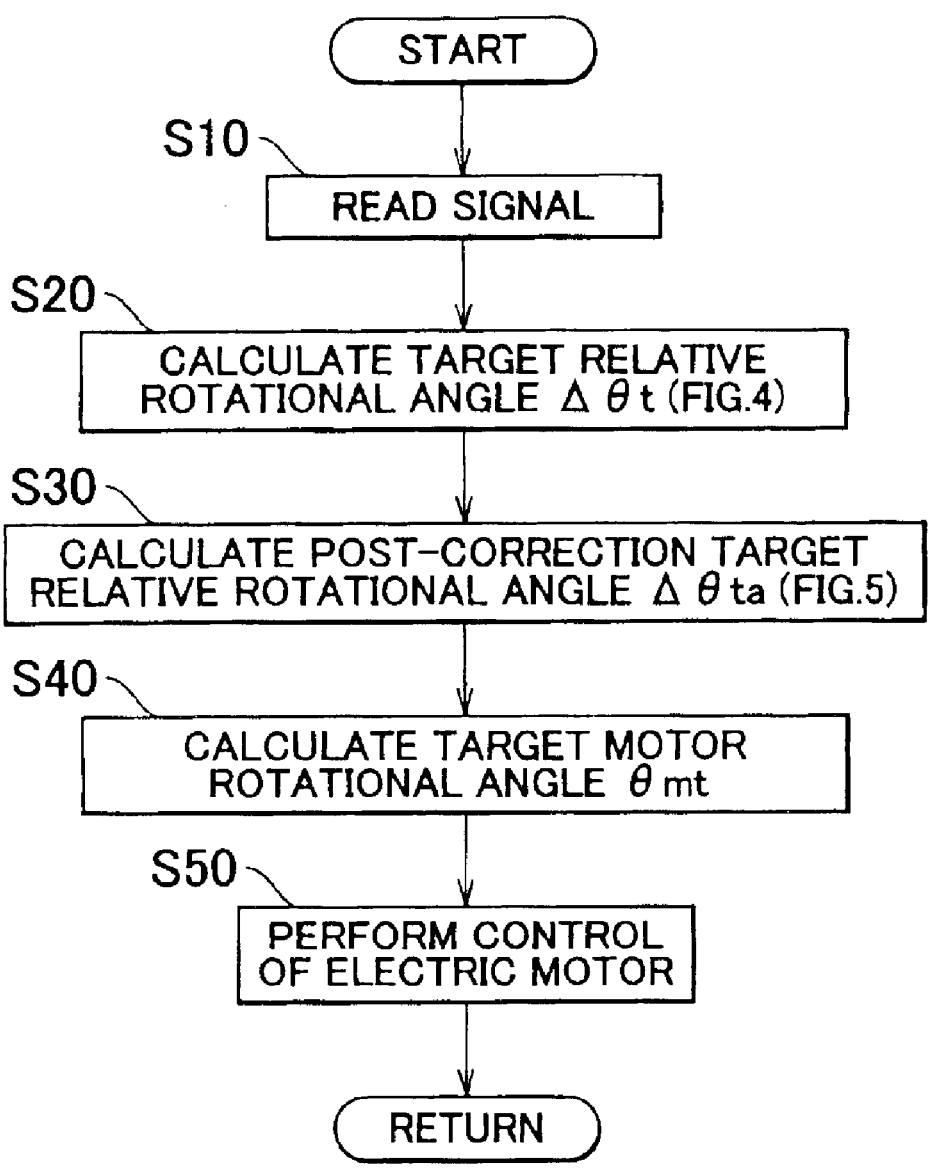
FIG. 3 is a flowchart showing a steering gear ratio control routine according to the first embodiment.

Further, when steering gear ratio cannot be controlled appropriately due to excessiveness of the steering torque T detected by the torque sensor 84 or an abnormality in any one of the sensors, the electronic control unit 80 stops an operation of controlling steering gear ratio according to the flowchart shown in FIG. 3, switches the lock unit 58 to its lock-on state, and thereby prevents relative rotation of the upper steering shaft 26 and the lower steering shaft 30 so as to ensure that they rotate integrally.

Although not shown in FIG. 1 in detail, the electronic control unit 80 has a CPU, a ROM, a RAM, and an input/output port unit. The electronic control unit 80 may be composed of a microcomputer in which those components are interconnected by a bidirectional bus, and of a drive circuit. Further, the rotational angle sensor 70 and the steering angle sensor 82 detect a relative rotational angle Δθ and a steering angle θ respectively on the assumption that they assume positive values when the vehicle is steered in the right-turn direction with respect to a straight direction. The torque sensor 84 detects a steering torque T on the assumption that it assumes a positive value when the vehicle is steered in the right-turn direction.

Next, a steering gear ratio control routine executed by the electronic control unit 80 in the illustrated first embodiment will be described with reference to the flowchart shown in FIG. 3. A steering gear ratio control operation according to the flowchart shown in FIG. 3 is started by closing an ignition switch (not shown) and is repeatedly performed at intervals of a predetermined period. If the ignition switch is closed, the lock unit 58 is switched from its lock-on state to its lock-off state prior to step 10. In principle, the lock unit 58 is held in its lock-off state until the ignition switch is opened. These operations also hold true for other embodiments which will be described later.

First of all in step 10, a signal indicating a steering angle β and the like are read. In step 20, a target relative rotational angle to be created by the steering gear ratio change unit 28, namely, a target relative rotational angle Δθt formed by the lower steering shaft 30 relative to the upper steering shaft 26 is calculated on the basis of a steering angle θ, by means of the map corresponding to the graph shown in FIG. 4.

In step 30, it is determined on the basis of a vehicle speed V whether the vehicle runs at a speed in the low vehicle speed range, the intermediate vehicle speed range, or the high vehicle speed range. A post-correction target relative rotational angle Δθta of the steering gear ratio change unit 28 is calculated on the basis of the determined vehicle speed range and the target relative rotational angle Δθt, by means of the map corresponding to the graph shown in FIG. 5. Referring to FIG. 5, a thick solid line indicates that the vehicle runs at a speed in the low vehicle speed range, a thick broken line indicates that the vehicle runs at a speed in the intermediate vehicle speed range, and a thick alternate long and short dash line indicates that the vehicle runs at a speed in the high vehicle speed range.

In step 40, a target rotational angle θmt (=Δθta·Rr) of the electric motor 40 is calculated on the basis of the post-correction target relative rotational angle Δθta and a gear ratio Rr of the reduction unit 54. In step 50, the electric motor 40 is controlled such that a rotational angle Φ thereof becomes equal to the target rotational angle θmt.

Figure 6:
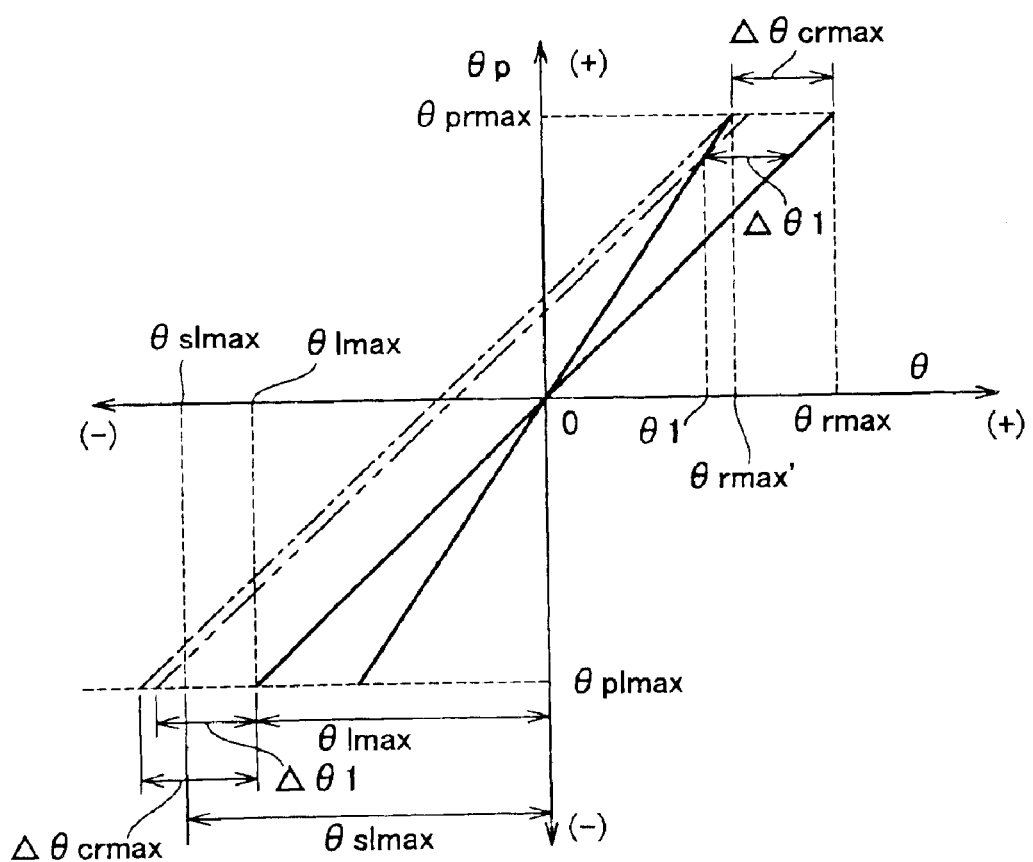
FIG. 6 is an explanatory view showing a case where an excessive tension is applied to a spiral cable in a steering control device of the related art in which target relative rotational angle Δθt is not restricted.

FIG. 6 is a graph showing a relationship between steering angle θ and pinion angle θp, that is, rotational angle of the pinion shaft 34 of the power steering unit 16 (=rotational angle of the lower steering shaft 30) in the steering control device of the related art in which the target relative rotational angle Δθt is not corrected as in the case of the invention, as to a case where the lock unit 58 is in its lock-on state (indicated by a thin solid line) and a case where the vehicle runs at a speed in the low vehicle speed range (indicated by a thick solid line). Referring to FIG. 6, it is to be noted that θprmax and θplmax respectively represent pinion angles θp corresponding to steering angles θrmax and θlmax in the case where the relative rotational angle Δθ is 0.

As shown in FIG. 6, if there occurs an abnormality in any one of the sensors when the steering angle θ is θ1 in the right-turn direction (a value close to a maximum value θrmax' of the steering angle θ while the vehicle runs at a speed in the low vehicle speed range) with the vehicle running, for example, at a speed in the low vehicle speed range, the lock unit 58 is switched from its lock-off state to its lock-on state. In this state, if the driver rotationally operates the steering wheel 14 in the left-turn direction, a straight direction to be set by the steering gear ratio change unit 28 deviates in the left-turn direction by an angle Δθ1. The steering angle θ and the pinion angle θp change as indicated by a thick alternate long and two short dashes line that is parallel to the thick solid line.

Accordingly, in the steering control device of the related art in which the target relative rotational angle Δθt is not corrected, the lock unit 58 is switched from its lock-off state to its lock-on state when the steering angle θ is close to θrmax. If the driver rotationally operates the steering wheel 14 in the left-turn direction until it becomes unable to be rotated any more, the steering angle θ becomes larger than the possible rotational angle θslmax that is restricted in the left-turn direction by the spiral cable unit 72. As a result, an excessive tensile stress is applied to the spiral cable 78, and the conductor wires contained therein may be ruptured.

Thus, in order to prevent an excessive tensile stress from being applied to the spiral cable 78, the sum of the angle θlmax (a constant) and an angle Δθcrmax needs to be equal to or smaller than θslmax. That is, an inequality (1) shown below needs to be established. In this inequality (1), it is to be noted that Δθcrmax represents a relative rotational angle formed between the upper steering shaft 26 and the lower steering shaft 30 in the right-turn direction when the pinion angle θp is equal to θprmax.

$$|\theta l\max|+|\theta cr\max|\leq|\theta sl\max| \quad (1)$$

By the same token, if there occurs an abnormality in any one of the sensors while the vehicle makes a left turn, the lock unit 58 is switched from its lock-off state to its lock-on state. In order to prevent an excessive tensile force from being applied to the spiral cable 78 in the case where the driver has rotationally operated the steering wheel 14 in the right-turn direction in this state, the sum of the angle θrmax (a constant) and an angle Δθclmax needs to be equal to or smaller than θsrmax. That is, an inequality (2) shown below needs to be established. In this inequality (2), it is to be noted that Δθclmax represents a relative rotational angle formed between the upper steering shaft 26 and the lower steering shaft 30 in the left-turn direction when the pinion angle θp is equal to θplmax.

$$|\theta r\max|+|\theta cl\max|\leq|\theta sr\max| \quad (2)$$

It is therefore understood that, in order to prevent an excessive tensile stress from being applied to the spiral cable 78, the target relative rotational angles Δθtar and Δθtal formed between the upper steering shaft 26 and the lower steering shaft 30 in the right-turn and left-turn directions need to respectively satisfy inequalities (3) and (4) shown below, which correspond to the aforementioned inequalities (1) and (2) respectively.

$$|\Delta\theta tar|\leq|\theta sl\max|-|\theta l\max| \quad (3)$$

$$|\Delta\theta tal|\leq|\theta sr\max|-|\theta r\max| \quad (4)$$

Figure 5:
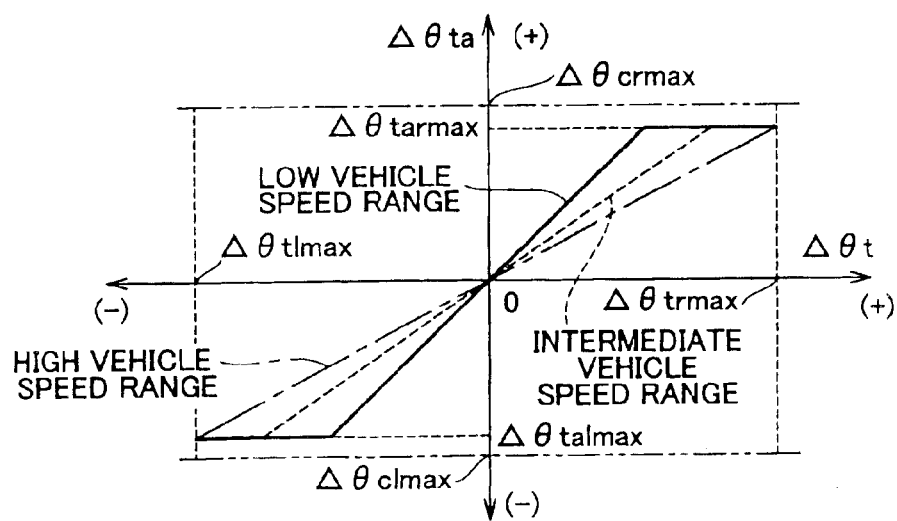
FIG. 5 is a graph showing a relationship between vehicle speed range and target relative rotational angle Δθt on one hand and post-correction target relative rotational angle Δθta of the steering gear ratio change unit on the other hand.
Figure 7:
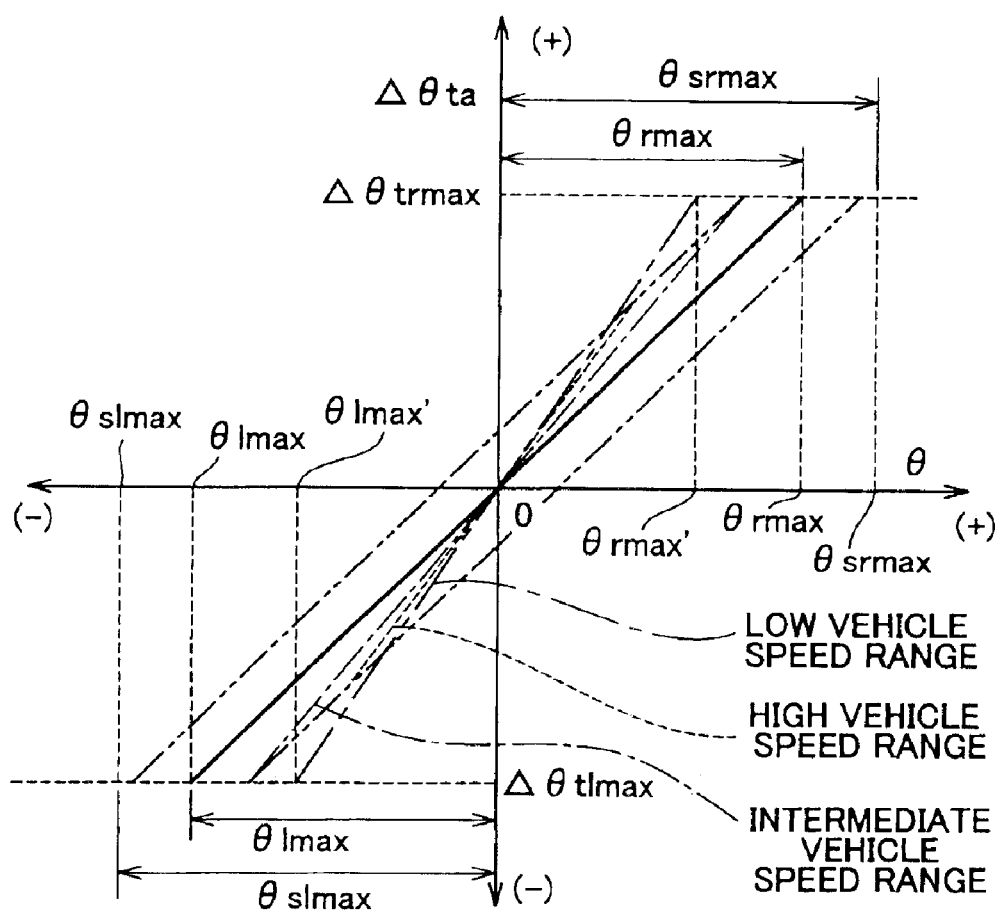
FIG. 7 is a graph showing a relationship between steering angle θ and post-correction target relative rotational angle Δθta in the first embodiment.

In the illustrated first embodiment, it is apparent from the graph shown in FIG. 5 that Δθtarmax and Δθtalmax are set smaller than Δθcrmax and Δθclmax respectively. A target relative rotational angle Δθta (Δθtar in the case of a right turn, Δθtal in the case of a left turn) that is calculated in step 30 never fails to satisfy the aforementioned inequalities (3) and (4). When the vehicle runs at a speed in the low vehicle speed range, the intermediate vehicle speed range, and the high vehicle speed range, the target relative rotational angle Δθt respectively changes as indicated by a thick solid line, a thick broken line, and a thick alternate long and short dash line in FIG. 7, in response to a change in the steering angle θ.

Thus, even in the case where the lock unit 58 has been switched to its lock-on state during a right turn of the vehicle and where the driver has rotationally operated the steering wheel 14 greatly in the left-turn direction or even in the case where the lock unit 58 has been switched to its lock-on state during a left turn of the vehicle and where the driver has rotationally operated the steering wheel 14 greatly in the right-turn direction, it is possible to reliably prevent an excessive tensile stress from being applied to the spiral cable 78 and to reliably prevent the conductor wires in the spiral cable 78 from being ruptured due to such an excessive tensile stress.

Figure 4:
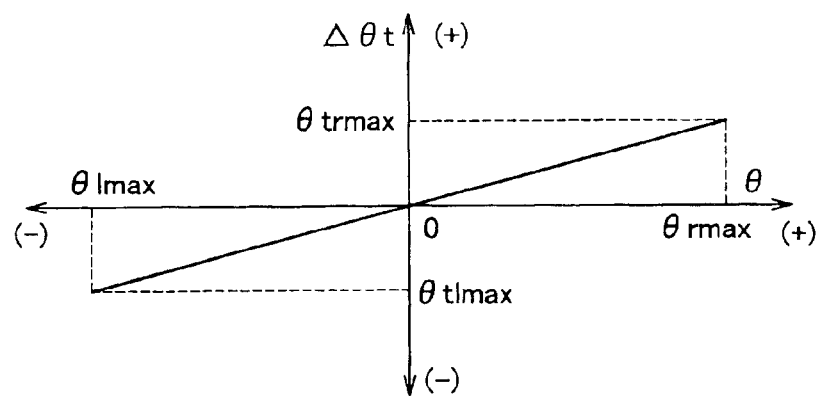
FIG. 4 is a graph showing a relationship between vehicle speed range and steering angle θ on one hand and target relative rotational angle Δθt formed by a lower steering shaft relative to an upper steering shaft on the other hand.

Especially according to the illustrated first embodiment, a target relative rotational angle Δθt which is to be created by the steering gear ratio change unit 28 and which is formed by the lower steering shaft 30 relative to the upper steering shaft 26 is calculated on the basis of a steering angle θ in step 20, by means of the map corresponding to the graph shown in FIG. 4. Also, according to this embodiment, it is determined on the basis of a vehicle speed V whether the vehicle runs at a speed in the low vehicle speed range, the intermediate vehicle speed range, or the high vehicle speed range in step 30, and a post-correction target relative rotational angle Δθta to be created by the steering gear ratio change unit 28 is calculated on the basis of the determined vehicle speed range and the target relative rotational angle Δθt, by means of the map corresponding to the graph shown in FIG. 5. Therefore, it is possible to increase steering gear ratio with decreases in vehicle speed, to reliably prevent an excessive tensile stress from being applied to the spiral cable 78, and to reliably prevent the conductor wires in the spiral cable 78 from being ruptured due to such an excessive tensile stress.

Further, according to the illustrated first embodiment, the spiral cable unit 72 is constructed such that inequalities θsrmax>θrmax and |θslmax|>|θlmax| are established. It is to be noted herein that θsrmax and θslmax represent possible rotational angles of the steering wheel 14 in the right-turn and left-turn directions respectively and that these angles are restricted by the spiral cable unit 72. Also, values of Δθtarmax and Δθtalmax are set smaller than values of Δθcrmax and $\Delta\theta c l m a x$ respectively. Therefore, for example, equations $\theta s r m a x = \theta r m a x$ and $|\theta s l m a x| = |\theta l m a x|$ are established. In comparison with a case where equations $\Delta\theta t a r m a x = \Delta\theta c r m a x$ and $|\Delta\theta t a l m a x| = |\Delta\theta c l m a x|$ are established, it is possible to more reliably prevent an excessive tensile stress from being applied to the spiral cable 78 and to more reliably prevent the conductor wires in the spiral cable 78 from being ruptured due to such a tensile stress.

Further, according to the illustrated first embodiment, if the lock unit 58 is switched to its lock-on state, the electric motor 40 is stopped from being supplied with power. Therefore, it is possible to prevent power from being wastefully consumed by the electric motor 40 and to reliably prevent an excessive rise in temperature from being caused by generation of heat by the electric motor 40. This also holds true for the other embodiments which will be described later.

Second Embodiment

The aforementioned first embodiment is suited for cases where the electric motor can precisely control rotational angle, for example, as in the case of a stepper motor. However, the second embodiment and the third embodiment that will be described later are suited for cases where the electric motor is a motor constructed, for example, as a direct-current motor and where a rotational angle to be created by the electric motor is subjected to feedback control.

Figure 8:
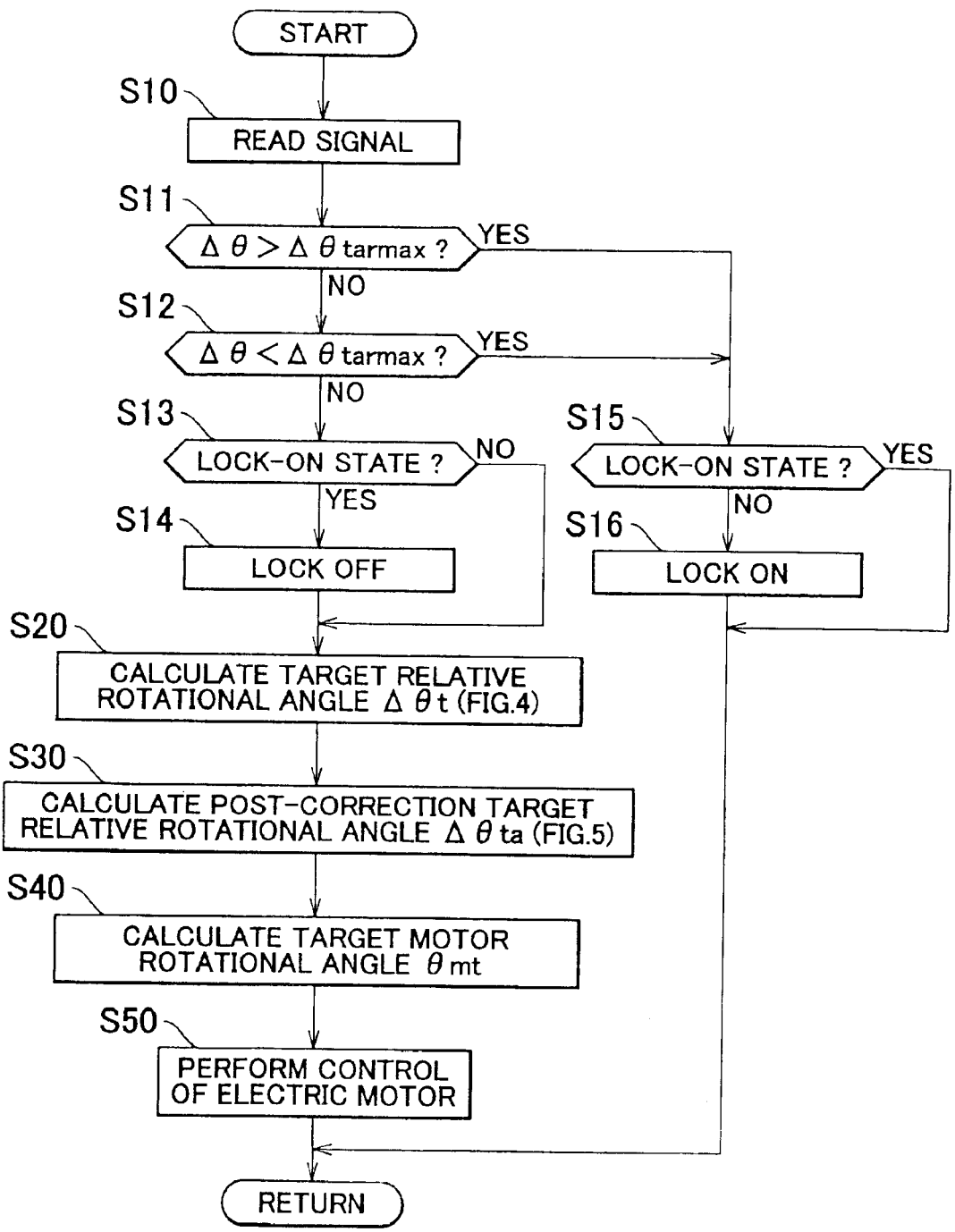
FIG. 8 is a flowchart showing a steering gear ratio control routine in a second embodiment of the invention.

Next, a steering gear ratio control routine in accordance with the second embodiment will be described with reference to a flowchart shown in FIG. 8. In FIGS. 8 and 3, like steps are denoted by like step numbers.

In the second embodiment, step 11 follows step 10. It is determined in step 11 whether or not a relative rotational angle $\Delta\theta$ which is formed between the upper steering shaft 26 and the lower steering shaft 30 and which has been detected by the rotational angle sensor 70 has exceeded a reference value $\Delta\theta t a r m a x$ (see FIG. 5) in the right-turn direction. If an affirmative determination is made, the control operation proceeds to step 15. Conversely, if a negative determination is made, the control operation proceeds to step 12.

It is determined in step 12 whether or not the relative rotational angle $\Delta\theta$ which is formed between the upper steering shaft 26 and the lower steering shaft 30 and which has been detected by the rotational angle sensor 70 is below a reference value $\Delta\theta t a l m a x$ (see FIG. 5) in the left-turn direction. Namely, it is determined in step 12 whether or not a magnitude of the relative rotational angle $\Delta\theta$ has exceeded a magnitude of the reference value $\Delta\theta t a l m a x$ in the left-turn direction. If an affirmative determination is made, the control operation proceeds to step 15. If a negative determination is made, the control operation proceeds to step 13.

It is determined in step 13 whether or not the lock unit 58 is in its lock-on state, that is, whether or not the upper steering shaft 26 and the lower steering shaft 30 are stopped from rotating relative to each other. If an affirmative determination is made, the control operation proceeds to step 20 after the lock unit 58 has been switched to its lock-off state in step 14. If a negative determination is made, the control operation directly proceeds to step 20.

It is determined in step 15 whether or not the lock unit 58 is in its lock-off state, that is, whether or not the upper steering shaft 26 and the lower steering shaft 30 can rotate relative to each other. If a negative determination is made, the control operation returns to step 10 after the lock unit 58 has been switched to its lock-on state in step 16. If an affirmative determination is made, the control operation directly returns to step 10.

Thus, according to the illustrated second embodiment, if the relative rotational angle $\Delta\theta$ formed between the upper steering shaft 26 and the lower steering shaft 30 exceeds the reference value $\Delta\theta t a r m a x$ in the right-turn direction, an affirmative determination is made in step 11, and if the magnitude of the relative rotational angle $\Delta\theta$ exceeds the magnitude of the reference value $\Delta\theta t a l m a x$ in the left-turn direction, an affirmative determination is made in step 12. Then, the lock unit 58 is switched to its lock-on state in step 15 and step 16. Thus, the upper steering shaft 26 and the lower steering shaft 30 are prevented from rotating relative to each other until negative determinations are made in step 11 and step 12.

Accordingly, even in the case where the electric motor is constructed as a motor such as a direct-current motor and where rotational angle thereof is subjected to feedback control, it is possible to reliably prevent the magnitude of the relative rotational angle $\Delta\theta$ from further increasing after having exceeded the magnitude of the reference value. Thus, it is possible to reliably prevent an excessive tensile stress from being applied to the spiral cable 78 and to reliably prevent the conductor wires in the spiral cable 78 from being ruptured due to such an excessive tensile stress.

Third Embodiment

Figure 9:
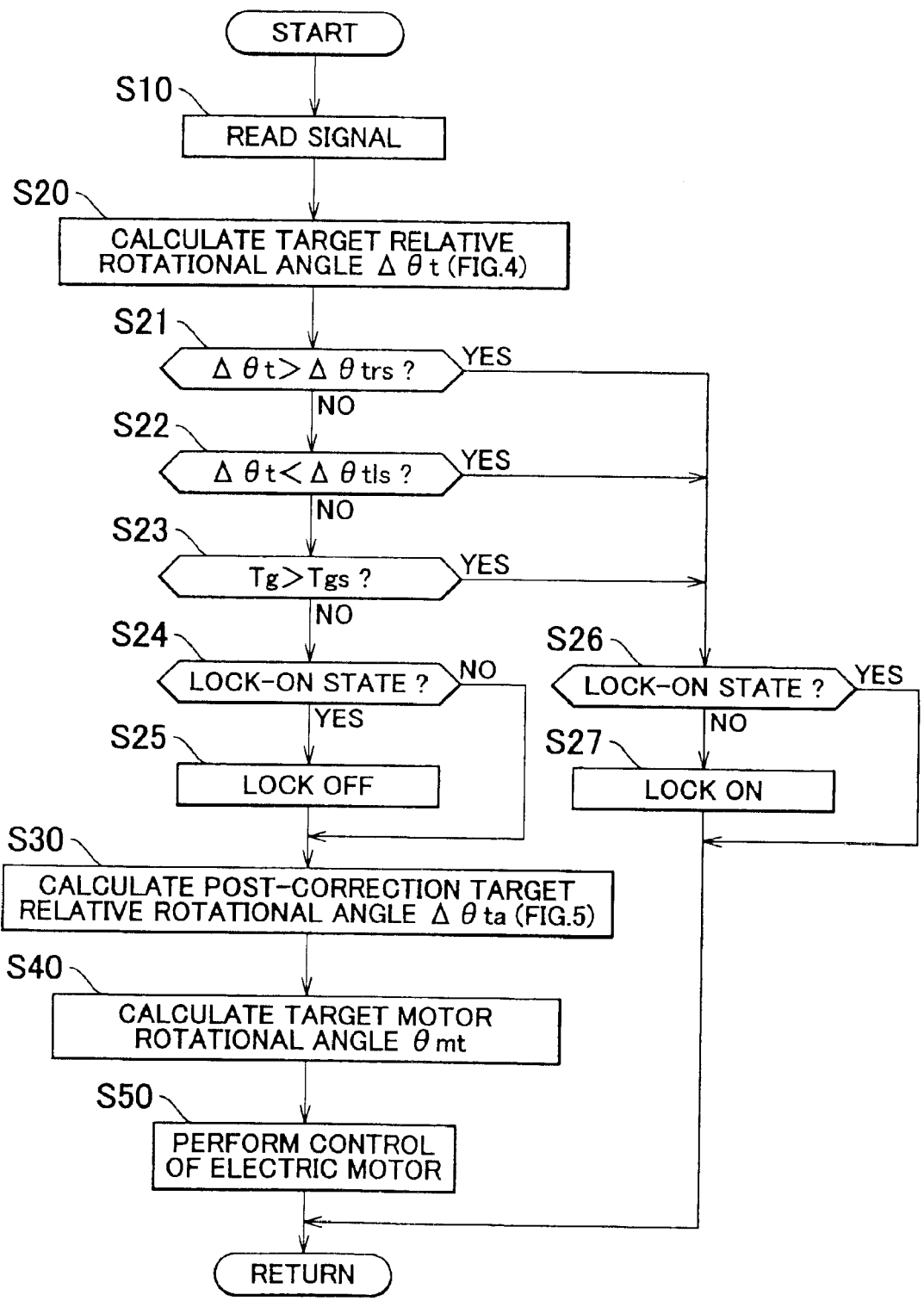
FIG. 9 is a flowchart showing a steering gear ratio control routine in a third embodiment of the invention.

FIG. 9 is a flowchart showing a steering gear ratio control routine in accordance with the third embodiment. In FIGS. 9 and 3, like steps are denoted by like step numbers.

In the third embodiment, step 21 follows step 20. It is determined in step 21 whether or not a target relative rotational angle $\Delta\theta t$ which is formed between the upper steering shaft 26 and the lower steering shaft 30 and which has been calculated in step 20 has exceeded a reference value $\Delta\theta t r s$ (a positive constant that is smaller than and close to $\Delta\theta t a r m a x$) in the right-turn direction. If an affirmative determination is made, the control operation proceeds to step 26. If a negative determination is made, the control operation proceeds to step 22.

It is determined in step 22 whether or not a target relative rotational angle $\Delta\theta t$ which is formed between the upper steering shaft 26 and the lower steering shaft 30 and which has been calculated in step 20 is below a reference value $\Delta\theta t l s$ (a negative constant that is larger than and close to $\Delta\theta t a l m a x$) in the left-turn direction. That is, it is determined in step 22 whether or not a magnitude of the target relative rotational speed $\Delta\theta t$ has exceeded a magnitude of the reference value $\Delta\theta t l s$ in the left-turn direction. If an affirmative determination is made, the control operation proceeds to step 26. If a negative determination is made, the control operation proceeds to step 23.

It is determined in step 23 whether or not a period Tg in which a post-correction target relative rotational angle $\Delta\theta t a$ that is calculated in step 30 is guarded by a maximum value $\Delta\theta t a r m a x$ during a right turn or a maximum value $\Delta\theta t a l m a x$ during a left turn through calculation of the post-correction target relative rotational angle $\Delta\theta t a$ has exceeded a reference value Tgs (a positive constant). If an affirmative determination is made, the control operation proceeds to step 26. If a negative determination is made, the control operation proceeds to step 24.

It is determined in step 24 whether or not the lock unit 58 is in its lock-on state, that is, whether or not the upper steering shaft 26 and the lower steering shaft 30 are stopped from rotating relative to each other. If an affirmative determination is made, the control operation proceeds to step 30 after the lock unit 58 has been switched to its lock-off state in step 25. If a negative determination is made, the control operation directly proceeds to step 30.

It is determined in step 26 whether or not the lock unit 58 is in its lock-off state, that is, whether or not the upper steering shaft 26 and the lower steering shaft 30 can rotate relative to each other. If a negative determination is made, the control operation returns to step 10 after the lock unit 58 has been switched to its lock-on state in step 27. If a negative determination is made, the control operation directly proceeds to step 10.

Thus, according to the illustrated third embodiment, if the target relative rotational angle formed between the upper steering shaft 26 and the lower steering shaft 30 exceeds the reference value Δθtrs in the right-turn direction, an affirmative determination is made in step 21. Also, if the magnitude of the target relative rotational angle Δθt has exceeded the magnitude of the reference value Δθtls in the left-turn direction, an affirmative determination is made in step 22. Further, if the period Tg in which the post-correction target relative rotational angle Δθta is guarded by the maximum value Δθtarmax during a right turn or the maximum value Δθtalmax during a left turn has exceeded the reference value Tgs, an affirmative determination is made in step 23. After an affirmative determination has been made in step 21, step 22, or step 23, the lock unit 58 is switched to its lock-on state in step 26 and step 27. Thus, the upper steering shaft 26 and the lower steering shaft 30 are prevented from rotating relative to each other until negative determinations are made in step 21, step 22, and step 23.

Accordingly, even in the case where the electric motor is constructed, for example, as a motor such as a direct-current motor and where rotational angle thereof is subjected to feedback control, the magnitude of the target relative rotational angle Δθt can be reliably prevented from further increasing after having exceeded the magnitude of the reference value Δθtrs or Δθtls. Thus, as in the case of the aforementioned second embodiment, it is possible to reliably prevent an excessive tensile stress from being applied to the spiral cable 78 and to reliably prevent the conductor wires in the spiral cable 78 from being ruptured due to such an excessive tensile stress.

The invention has been described in detail as to the specific embodiments thereof. However, it would be obvious to those skilled in the art that the invention is not limited to the aforementioned embodiments and that other varieties of embodiments are possible within the scope of the invention.

In the respective embodiments described above, for example, a target relative rotational angle Δθt is calculated on the basis of a steering angle θ in step 20, by means of the map corresponding to the graph shown in FIG. 4. Then, a post-correction target relative rotational angle Δθta is calculated on the basis of a vehicle speed range and the target relative rotational angle Δθt in step 30, by means of the map corresponding to the graph shown in FIG. 5. However, it is also appropriate that a post-correction target relative rotational angle Δθta be calculated on the basis of a vehicle speed range and a steering angle θ, by means of the map corresponding to the graph shown in FIG. 7.

Further, in the aforementioned respective embodiments, the spiral cable unit 72 is disposed around the upper steering shaft 26 above the electric motor 40. However, it is also appropriate that the spiral cable unit 72 be disposed around the lower steering shaft 30 below the electric motor 40.

Further, in the aforementioned respective embodiments, the lock unit 58 of plunger type prevents the upper steering shaft 26 and the lower steering shaft 30 from rotating relative to each other. However, a lock unit having any structure known in the technical field of the invention can also be employed. In addition, although the amount of relative rotation between the upper steering shaft 26 as an input portion and the lower steering shaft 30 as an output portion is inhibited from increasing or decreasing by preventing them from rotating relative to each other. However, it is also appropriate that the amount of relative rotation between them be inhibited from increasing or decreasing by allowing them to rotate relative to each other less often.

Further, in the aforementioned respective embodiments, the electric motor 40 of the steering gear ratio change unit 28 as an actuator of the steering transmission ratio change means is coupled on the side of the stator 44 thereof to the upper steering shaft 26 as an input portion, and is coupled on the side of the rotor 50 to the lower steering shaft 30 as an output portion. However, it is also appropriate that the actuator of the steering transmission ratio change means be coupled on the side of the stator to the output portion and be coupled on the side of the rotor 50 to the input portion.

Further, in the aforementioned respective embodiments, the power steering unit of the steering mechanism is supplied with high-pressure oil by the electric pump 24. However, a generally employed hydraulic power steering unit that is supplied with high-pressure oil by an oil pump driven by an internal combustion engine may also be employed. Alternatively, a motorized power steering unit in which an auxiliary steering torque is generated by an electric motor may also be employed.

Further, in the aforementioned respective embodiments, steering gear ratio is variably set in accordance with vehicle speed range such that steering gear ratio increases with decreases in vehicle speed V. However, it is also appropriate the steering gear ratio be so corrected as to be variably set by a correction coefficient that is based on vehicle speed. Also, the steering control device of the invention may be applied to an active steering unit that assists steered wheels in accordance with driving circumstances of a vehicle.

What is claimed is:

1. A vehicular steering control device comprising:
   an input portion coupled to a steering wheel that is operated by a driver;
   an output portion drivingly connected to steered wheels;
   a steering transmission ratio change device that changes a steering transmission ratio by causing the input portion and the output portion to rotate relative to each other by an actuator that rotationally operates in association with the steering wheel;
   an electric connection mechanism that supplies the actuator with electric power from an external side; and
   a restriction device that sets a restricted relative rotational angle to be created by the actuator in one lateral direction equal to or smaller than a difference between a permissible rotational angle to be defined by the electric connection mechanism in the other lateral direction and a maximum possible rotational angle of the output portion in the other lateral direction, and controls a relative rotational angle to be created by the actuator in said one lateral direction to an angle equal to or smaller than the restricted relative rotational angle.

2. The steering control device according to claim 1, wherein the actuator has a stator coupled to one of the input and output portions and a rotor coupled to the other of the input and output portions.

3. The steering control device according to claim 1, wherein the actuator is an electric motor.

4. The steering control device according to claim 3, wherein the electric motor is coupled at the stator to the input portion and at the rotor to the output portion.

5. The steering control device according to claim 1, wherein the restriction device sets a magnitude of a target relative rotational angle to be created by the actuator equal to or smaller than a magnitude of the restricted relative rotational angle.

6. The steering control device according to claim 5, wherein the restriction device sets a target relative rotational angle to be created by the actuator as an angle whose magnitude is smaller than a restricted relative rotational angle.

7. The steering control device according to claim 1, wherein the restriction device inhibits an amount of relative rotation of the input and output portions from increasing or decreasing if a magnitude of a relative rotational angle to be created by the actuator becomes equal to or larger than a magnitude of the restricted relative rotational angle.

8. The steering control device according to claim 7, wherein the restriction device prevents the input and output portions from rotating relative to each other if a magnitude of a relative rotational angle to be created by the actuator becomes equal to or larger than a magnitude of a restricted relative rotational angle.

9. The steering control device according to claim 7, wherein the restriction device inhibits the amount of relative rotation from increasing or decreasing by causing the input and output portions to rotate integrally, and reduces a rotational output of the actuator.

10. The steering control device according to claim 9, wherein the restriction device reduces a rotational output of the actuator to 0 when the rotational output of the actuator is to be reduced.

11. The steering control device according to claim 1, wherein the restriction device inhibits an amount of relative rotation of the input and output portions from increasing or decreasing if a magnitude of a relative rotational angle to be created by the actuator becomes equal to or larger than a predetermined value that is smaller than a magnitude of the restricted relative rotational angle.

12. The steering control device according to claim 11, wherein the restriction device prevents the input and output portions from rotating relative to each other if a magnitude of a relative rotational angle to be created by the actuator becomes equal to or larger than a predetermined value that is smaller than a magnitude of a restricted relative rotational angle.

13. The steering control device according to claim 11, wherein the restriction device inhibits the amount of relative rotation from increasing or decreasing by causing the input and output portions to rotate integrally, and reduces a rotational output of the actuator.

14. The steering control device according to claim 13, wherein the restriction device reduces a rotational output of the actuator to 0 when a rotational output of the actuator is to be reduced.

15. The steering control device according to claim 1, wherein the restriction device sets a restricted relative rotational angle as an angle whose magnitude is smaller than a difference between a permissible rotational angle to be defined by the electric connection mechanism in the other lateral direction and a maximum possible rotational angle of the output portion in the other lateral direction, and controls a magnitude of a relative rotational angle to be created by the actuator in said one lateral direction to a value equal to or smaller than a magnitude of the restricted relative rotational angle.

16. The steering control device according to claim 1, wherein the electric connection mechanism has an outer power supply member fixed to a vehicle body, an inner power supply member fixed to the input portion or the output portion, and a flexible spiral cable that spirally extends around the inner power supply member and that contains conductor wires for connecting the outer power supply member with the actuator.

17. The steering control device according to claim 16, wherein the permissible rotational angle to be defined by the electric connection mechanism in the other lateral direction is a permissible rotational angle that is defined in the other lateral direction by a length of the spiral cable, an inner diameter of the outer power supply member, and an outer diameter of the inner power supply member.

18. The steering control device according to claim 1, wherein the output portion is drivingly connected to the steered wheels via a steering mechanism, and wherein the maximum possible rotational angle of the output portion in the other lateral direction is a maximum possible rotational angle that is defined by a turnable range of the steered wheels or an operable range of the steering mechanism.

19. A control method for a vehicular steering device having an input portion coupled to a steering wheel that is operated by a driver, an output portion drivingly connected to steered wheels, a steering transmission ratio change device that changes a steering transmission ratio by causing the input portion and the output portion to rotate relative to each other by an actuator that rotationally operates in association with the steering wheel, and an electric connection mechanism that supplies the actuator with electric power from an external side, the control method comprising the steps of:

setting a restricted relative rotational angle to be created by the actuator in one lateral direction equal to or smaller than a difference between a permissible rotational angle to be defined by the electric connection mechanism in the other lateral direction and a maximum possible rotational angle of the output portion in the other lateral direction; and controlling a relative rotational angle to be created by the actuator in said one lateral direction to an angle equal to or smaller than the restricted relative rotational angle.

* * * * *